(12) United States Patent
Khattaty et al.

(10) Patent No.: US 7,297,651 B2
(45) Date of Patent: Nov. 20, 2007

(54) PROCESS FOR REMOVING SULFUR PARTICLES FROM AN AQUEOUS CATALYST SOLUTION AND FOR REMOVING HYDROGEN SULFIDE AND RECOVERING SULFUR FROM A GAS STREAM

(75) Inventors: Mohammad Reza Khattaty, Tehran (IR); Khaled Forsat, Tehran (IR); Reza Hashemi, Tehran (IR); Hossein Manafi Varkiani, Tehran (IR)

(73) Assignee: Research Institute of Petroleum Industry, Tehran (IR)

( * ) Notice: Subject to any disclaimer, the term of this patent is extended or adjusted under 35 U.S.C. 154(b) by 0 days.

(21) Appl. No.: 11/446,021

(22) Filed: Jun. 1, 2006

(65) Prior Publication Data

US 2007/0020170 A1    Jan. 25, 2007

(30) Foreign Application Priority Data

Jun. 2, 2005    (EP)   ................... 05104812

(51) Int. Cl.
| | |
|---|---|
| B01J 38/12 | (2006.01) |
| B01J 38/40 | (2006.01) |
| B01J 38/48 | (2006.01) |
| C01B 17/05 | (2006.01) |

(52) U.S. Cl. .................... 502/34; 502/38; 502/39; 423/576.2; 423/576.5; 423/576.6

(58) Field of Classification Search .................. 502/34, 502/38, 39; 423/576.2, 576.5, 576.6
See application file for complete search history.

(56) References Cited

U.S. PATENT DOCUMENTS 4,421,733 A * 12/1983 Blytas .................. 423/576.6

| | | |
|---|---|---|
| 4,784,754 A | 11/1988 | Fong et al. |
| 4,816,238 A | 3/1989 | Jeffrey |
| 5,122,351 A | 6/1992 | Hardison |

(Continued)

FOREIGN PATENT DOCUMENTS

EP        0 186 235        7/1984

(Continued)

OTHER PUBLICATIONS

I. Iliuta, F. Larachi, "Concept of Bifunctional Redox Iron-Chelate Process for $H_2S$ Removal In Pulp and Paper Atmospheric Emissions," Sep. 9, 2003, pp. 5305-5314, Chemical Engineering Science.

Primary Examiner—Timothy C. Vanoy
(74) Attorney, Agent, or Firm—Kenyon & Kenyon LLP (57) ABSTRACT

The invention relates to a process for removing sulfur particles from an aqueous catalyst solution used to remove hydrogen sulfide from a gas stream (1, 5), comprising the steps of directing a flow of a suspension (12) comprising reduced catalyst solution and sulfur particles to an oxidizer zone (20), where the catalyst solution is regenerated by contacting said suspension with a gas (22) containing oxygen; and removing sulfur from said suspension at least by gravity sedimentation at a bottom (21) of said oxidizer zone (20). According to the invention a flow deflecting means (34) is disposed at least at an outlet (35) for the oxidized catalyst solution leaving said oxidizer zone (20) such as to prevent any turbulent state caused at least by a stream of oxidized catalyst solution leaving said oxidizer zone (20).

9 Claims, 5 Drawing Sheets

U.S. PATENT DOCUMENTS

| | | |
|---|---|---|
| 5,484,471 A | 1/1996 | Schwab |
| 6,165,436 A * | 12/2000 | Dezael et al. ............ 423/576.4 |
| 6,309,609 B1 | 10/2001 | Lecomte et al. |
| 6,596,253 B1 * | 7/2003 | Barrere-Tricca et al. . 423/573.1 |
| 6,703,530 B2 | 3/2004 | Kissinger et al. |
| 2002/0119086 A1 * | 8/2002 | Huard et al. ................ 423/224 |

FOREIGN PATENT DOCUMENTS

EP    0 582 337    2/1994

* cited by examiner

PROCESS FOR REMOVING SULFUR PARTICLES FROM AN AQUEOUS CATALYST SOLUTION AND FOR REMOVING HYDROGEN SULFIDE AND RECOVERING SULFUR FROM A GAS STREAM

CROSS-REFERENCE TO RELATED APPLICATION

The present application claims priority to European Application No. 05104812.2 filed in the European Patent Office on Jun. 2, 2005 of which is expressly incorporated herein in its entirety by reference thereto.

TECHNICAL FIELD OF THE INVENTION

The present invention relates to a process for removing hydrogen sulfide ($H_2S$) from gas streams, by using a redox process and removing the resulting sulfur particles from an aqueous catalyst solution used during the redox process.

BACKGROUND OF THE INVENTION

The presence of hydrogen sulfide in gas streams causes different problems in oil, gas and petrochemical industries and even wood and drink industries. Removing $H_2S$ from gas streams has, hence, changed to a necessary process. Furthermore, the regulations of environment conservation organizations, on the permitted amounts of $H_2S$ are getting more and more strict every day. This is mainly because of the poisonous and corrosive effects of $H_2S$.

Application of an aqueous solution of a polyvalent metal chelate catalyst for the oxidative removing of $H_2S$, from gas streams and its conversion to elemental sulfur has been well known. In these processes, $H_2S$-containing gas is contacted with an aqueous solution of a polyvalent metal chelate in a contact zone. The contactor can be any suitable device for gas—liquid contact, such as an absorber, a static mixer, a venturi scrubber, or even a combination of all. The aqueous catalyst solution absorbs $H_2S$ and converts it to elemental sulfur rapidly. As a result of this the higher oxidation state of the ion is reduced to its lower state. The lower oxidation state of the ion metal is then oxidized, as a result of contact with an oxygen containing gas to its higher oxidation state and is returned to the contact zone. Such reactions are called liquid Redox reactions. The separation of the solid particles can take place either before or after regenerating of the polyvalent metal chelate.

Due to settling or sedimentation of sulfur particles, however, the contactor can become plugged. If the settling happens to a great extent and the tower is plugged, this will perturb the contactor, in particular an absorber, and it will ultimately flood. In the case of the application of an absorber, filled with a packing, the choice of the packing material is also important. Usually a suitable packing has to be selected, which results in the least setting of solid sulfur particles. Often, such a packing does not exhibit optimum reaction rates.

U.S. Pat. No. 4,784,754 discloses a process for removing sulfur particles from an aqueous polyvalent metal ion or polyvalent metal chelate solution by a method of sinking the sulfur particles (gravity sedimentation) in a zone. In order to reduce foam and/or froth floating on a surface of the zone, sulfur particles suspended as a froth or foam are agitated and removed in a plurality of streams including at least one stream at a short distance from the top of the solution in the zone and at least one stream from the bottom of the solution in the zone. Subsequently, the streams are recombined for further processing.

U.S. Pat. No. 4,816,238 discloses another process for the removal of hydrogen sulfide from a sour gaseous stream, wherein an aqueous alkaline solution is contacted with a polyvalent metal chelate in a higher valence state in order to oxidize the hydrogen sulfide or sulfide present to sulfur. Particular measures for preventing clogging of sulfur particles in the oxidizer are not disclosed.

EP 0 582 337 A discloses another process for removing hydrogen sulfide from a gas mixture. U.S. Pat. No. 5,122,351 discloses another process for removing hydrogen sulfide from a process gas, wherein a closed loop evaporator/condenser process is interposed in the sulfur washing/filtering/recovery process in order to recover and re-use a catalytic polyvalent metal redox solution. Wash water used to purify the sulfur and any polyvalent metal redox solution recovered from a sulfur melter are fed to an evaporator to concentrate the redox solution to a concentration capable of effective absorption of hydrogen sulfide. Furthermore, the water evaporated in the evaporator is condensed as pure water for use in washing and/or filtering the recovered sulfur. Particular measures for preventing clogging of sulfur particles in the oxidizer are not disclosed.

EP 0 186 235 A1 discloses a process for removal of acid gases from a sour gaseous stream. In the process a sour gaseous stream comprising $H_2S$ is contacted in a column with an aqueous reactant solution comprising an effective amount of Fe(III) chelate of an organic acid to obtain a sweet gaseous stream and a mixture including solid sulfur and Fe(II) chelate of the acid. Degradation of the iron chelate in the reactant solution employed in the cyclic process is inhibited by maintaining a relatively high Fe(II) chelate concentration by carrying out the regeneration step in the column as a plug flow contracting procedure. The problem of foaming and flooding of the oxidizer is not discussed specifically. The flow state in the oxidizer zone is not addressed specifically. Separation of the sulfur particles takes place in a separate vessel.

U.S. Pat. No. 6,596,253 B1 discloses a process for desulfurization of a gaseous feed containing hydrogen sulfide. The sulfur particles and the reduced catalyst solution are separated in a preliminary step and the stream of reduced catalyst solution is sent to a downstream oxidizer.

General principles for use of ferric chelates for the oxidization of hydrogen sulfide are disclosed in lliuta I., et al., 'Concept of bifunctional Redox iron-chelate process for H2S removal in pulp and paper atmospheric emissions', Chemical Engineering Science, Oxford, GB, volume 58, no. 34-24, December 2003, pages 5305-5314.

SUMMARY OF THE INVENTION

It is an object of the present invention to provide a more efficient, reliable and economical process for removing sulfur particles from an aqueous catalyst solution used to remove hydrogen sulfide from a gas stream. It is another object of the present invention to provide a more efficient, reliable and economical process for removing hydrogen sulfide and recovering sulfur from a gas stream. According to another aspect of the invention excessive foaming and flooding of the oxidizer zone is to be avoided in such a process.

According to a first aspect of the present invention there is provided a process for removing sulfur particles from an aqueous catalyst solution used to remove hydrogen sulfide from a gas stream, comprising the steps of: directing a flow of a suspension comprising reduced catalyst solution and sulfur particles to an oxidizer zone, where the catalyst solution is regenerated by contacting said suspension with a gas containing oxygen; and removing sulfur from said suspension at least by gravity sedimentation at a bottom of said oxidizer zone; wherein a flow deflecting means is disposed at least at an outlet for the oxidized catalyst solution leaving the oxidizer zone for reducing any turbulent state caused at least by a stream of oxidized catalyst solution leaving said oxidizer zone such as to reduce foaming and plugging of the whole system. Thus, excessive foaming is prevented according to the present invention. Furthermore, gravity sedimentation of sulfur particles is promoted.

According to another embodiment the flow deflecting means is a baffle disposed under an acute angle with a circumferential surface or wall of the vessel surface of said oxidizer zone such that said streams of oxidized catalyst solution leaving said oxidizer zone are deflected to another direction before leaving said oxidizer zone. Of course, the flow of oxidized catalyst solution leaving the oxidizer zone can be deflected such that the streams within the liquid phase of the oxidizer zone are supported, in particular such that the streams within the liquid phase of the oxidizer zone remain in a laminar state. Further, according to this embodiment the baffle means effectively shields the outlet for the reduced catalyst solution as to prevent the direct transfer of solid sulfur particles during sedimentation within the oxidizer zone into the stream of oxidized catalyst solution leaving the oxidizer zone.

According to further embodiments, the afore-mentioned flow deflecting means may also be disposed alternatively or additionally at any inlet or outlet where streams enter or leave the oxidizer zone, in particular a lower section thereof used for sedimentation of sulfur particles by gravity, such as to reduce foaming and plugging of the whole system.

According to another embodiment said oxidizer zone is a bubble column, the gas containing oxygen is bubbled into said column by means of at least one sparger so that lighter sulfur particles go up to an upper surface of a liquid phase within said column, and said flow of suspension enters said column at a position vertically disposed at a short distance below said upper surface. Thus, the convection-like roll of streams in the liquid phase within the oxidizer zone is further supported.

According to another aspect of the present invention that can also be combined with any other embodiment disclosed herein there is provided a process for removing sulfur particles from an aqueous catalyst solution used to remove hydrogen sulfide from a gas stream, comprising the steps of: directing a flow of a suspension comprising reduced catalyst solution and sulfur particles to an oxidizer zone, where the catalyst solution is regenerated by contacting said suspension with a gas containing oxygen; and removing sulfur from said suspension at least by gravity sedimentation at a bottom of said oxidizer zone; wherein the bottom of the oxidizer zone comprises a downwardly slanted surface and a gas is additionally injected at said bottom of said oxidizer zone substantially in parallel or tangentially to said slanted surface for avoiding sedimentation and agglomeration of sulfur particles on said bottom. According to this aspect of the invention, any settled sulfur may be 'blown' or pushed away towards the center part of the bottom part where an outlet for transferring the slurry to a subsequent process stage is provided.

According to another embodiment lighter sulfur particles and/or foam floating on a surface of said liquid phase are collected by a sweeper rotating at low speed and removed from said oxidizer zone for further processing.

According to another aspect of the present invention that can also be combined with any other embodiment disclosed herein there is provided a process for removing sulfur particles from an aqueous catalyst solution used to remove hydrogen sulfide from a gas stream, comprising the steps of: directing a flow of a suspension comprising reduced catalyst solution and sulfur particles to an oxidizer zone, where the catalyst solution is regenerated by contacting said suspension with a gas containing oxygen; and removing sulfur from said suspension at least by gravity sedimentation at a bottom of said oxidizer zone; wherein lighter sulfur particles and/or foam are collected simultaneously to removal of heavier sulfur particles at said bottom of said oxidizer zone and the removed sulfur particles and/or foam are transferred for further processing continuously or in a batch wise mode. Thus, by sweeping of the lighter sulfur particles as foam in the top part of the oxidizer zone and simultaneous settlement and carrying away of the heavier sulfur particles in the bottom part of the oxidizer zone plugging and foaming is substantially reduced according to the present invention.

According to another aspect of the present invention there is provided a process for removing hydrogen sulfide and recovering sulfur from a gas stream, comprising the steps of: contacting said gas stream with an aqueous catalyst solution of a polyvalent metal redox catalyst in a contacting zone to absorb said hydrogen sulfide and form a reduced catalyst solution comprising reduced polyvalent metal redox catalyst and sulfur particles; oxidizing said reduced catalyst solution while removing sulfur particles by a method as outlined above to form a regenerated or oxidized aqueous catalyst solution comprising polyvalent metal redox catalyst in an oxidized state with sulfur particles removed; and recovering sulfur by transferring said sulfur particles and/or foam to a separation zone; wherein a coagulating reagent is added to a feed of said separation zone prior to entering said separation zone to promote settlement of sulfur particles.

According to another embodiment said coagulating reagent is acryl amide and is added to said feed a predetermined time interval before entering said separation zone, preferably by 1-3 seconds.

According to another embodiment heavy hydrocarbons and/or water are removed from said gas stream in a gas/liquid separation means and said treated gas stream is cooled to a predetermined temperature range before said step of contacting said gas stream with said aqueous catalyst solution is performed.

According to another embodiment said gas stream is contacted with said aqueous catalyst solution in a Venturi scrubber.

According to another embodiment said gas stream is contacted with said aqueous catalyst solution in an absorber containing a packing material, where a mass transfer takes place between a liquid film of said aqueous catalyst solution formed on the packing material and said gas stream bubbling through the packing material.

According to another embodiment the packing material is at least partially a random packing consisting of metal packing members, preferably of stainless steel elements. These metal packing members can be shaped like hollow ring-shaped members having concavely curved wing-shaped members extending inwards in radial direction. These metal packing members may be packed at predetermined portions of the absorber, preferably as a random packing, whereas the remaining portions of the absorber may be free of such metal packing elements.

According to another embodiment a pressure difference between an inlet and an outlet of said contacting zone is regulated to a predetermined pressure range to control the inlet flow of gas to said contacting zone.

According to another embodiment said flow of a suspension is heated or cooled to a predetermined temperature range before entering said oxidizer zone.

According to another embodiment said temperature range is below a degradation temperature of said polyvalent metal redox catalyst, preferably in the range between 30° C. and 50° C., in particular in a range in which the catalytic regeneration is also high.

As will become apparent to a person skilled in the art, according to a particularly preferred embodiment of the present invention, any of the following measures, as explained in more detail above, can contribute in a particular combinatorial manner to substantially reduce plugging and foaming in a process for removing sulfur particles from an aqueous catalyst solution used to remove hydrogen sulfide from a gas stream. Such measures are in particular:

using simultaneous settlement and floatation separations; and/or
adding a coagulant in a proper time and place; and/or
use of a sweeper; and/or
use of a special packing in the absorber zone; and/or
use of flow deflecting means, in particular baffles, in the oxidizer zone.

BRIEF DESCRIPTION OF DRAWINGS

Hereinafter, exemplary embodiments according to the present invention will be described with reference to the accompanying drawings, from which further features, advantages and objects will become apparent and wherein.

DETAILED DESCRIPTION OF EXEMPLARY EMBODIMENTS

The present invention relates to the reduction of foaming and plugging in processes where $H_2S$ is separated from $H_2S$-containing gas streams, by being contacted with an aqueous catalyst solution comprising a chelate of a polyvalent metal ion, which is preferably an iron chelate.

Figure 1:
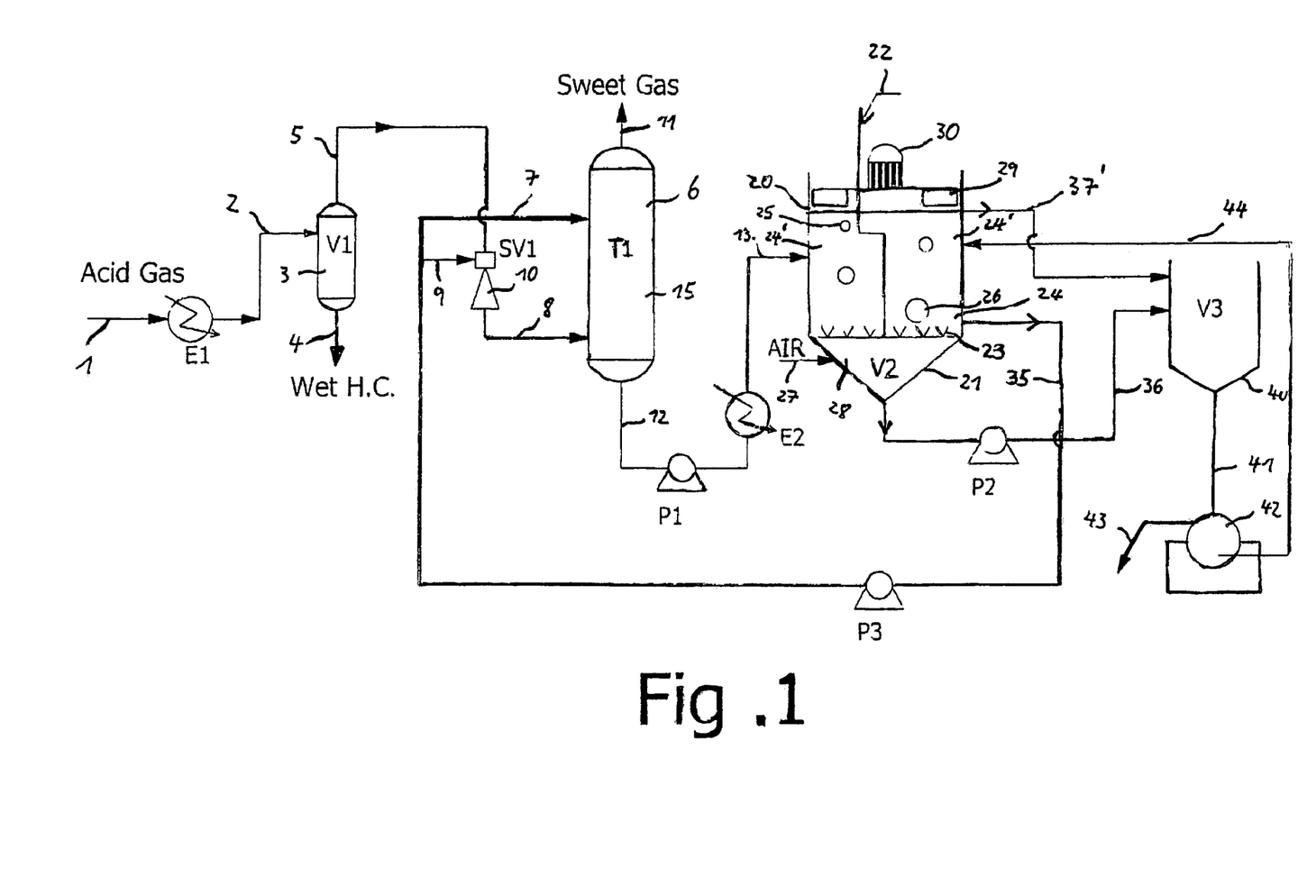
FIG. 1 shows a schematic view for illustrating a process according to the present invention for removing hydrogen sulfide and recovering sulfur from a gas stream.

As shown in FIG. 1, the overall process comprises three major sections, namely the contact zone 6, the oxidizer zone 20 and the separator zone 40. As shown in FIG. 1, a sour or acid gas 1 is fed via a heat exchanger E1 and line 2 to a gas-liquid-separator 3, which separates any liquid heavy hydrocarbons and water to line 4, as outlined further below.

The separated gaseous hydrocarbons are fed via line 5, Venturi scrubber 10 and line 8 to the contact zone 6. More specifically, the acid or sour gas stream 8 enters the contact zone 6 at a bottom part thereof.

The contact zone 6 can be an absorber, a static mixer, a venturi scrubber or a combination thereof. Preferably, according to the present invention the contact zone 6 is a Venturi scrubber. In the contact zone 6, the $H_2S$-containing gas stream, which enters the contact zone 6 via the inlet 8, is contacted with the aqueous solution of the catalyst, containing the polyvalent metal ion chelate, at temperatures lower than the melting point of sulfur. According to this embodiment, the polyvalent metal ion chelate is preferably a $Fe^{3+}$ chelate, although the present invention is not limited thereto. As a result of the contact, the higher oxidation state of the metal ion ($Fe^{3+}$ in the case of an iron chelate) is reduced to its lower oxidation state (reduced state; $Fe^{2+}$ in the case of an iron chelate), and the ionic sulfur is oxidized to its elemental form, according to the following reactions (1-3):

In this process, solid sulfur particles are formed. As a result of this fast process about 90% of the sulfur content of the gas stream 8 is removed. The mixture of the solid sulfur particles and of the different oxidation states of the metal ion chelate (a mixture of $Fe^{2+}$ and $Fe^{3+}$ in the case of the application of the iron chelate), forming a slurry, leaves the contact zone 6 via line 12 at the bottom of the contact zone 6 and is pumped, by means of pump P1, to the inlet 13 of the oxidizer zone 20, which will be described in more detail below. The substantially $H_2S$-free gas leaves the contact zone 6 via the outlet line 11.

More specifically, the substantially $H_2S$-free gas starts an upward movement in the contact zone 6, where some aqueous catalyst is injected to the contact zone 6 from its top part via inlet 7. Thus, the aqueous catalyst solution flows down by gravity while the gas rises counter-currently through the contact zone 6. In the contact zone 6 a mass transfer takes place across the gas-liquid interface thus formed. Thereby, the probability of the formation of the black FeS impurity is minimized, so that it starts a downward movement, opposite to that of the up-going gas, eliminating the remaining 10% of the sulfur.

Flooding of the system, in particular of the contact zone 6, can also be controlled and prevented by using a cascade control system. The control system holds the Δp of the system (the pressure difference between the outlet 11 and the inlet 8 of the contact zone 6) at a certain predetermined value by varying the flow of hydrocarbon gas stream 5.

Extensive experiments of the inventors surprisingly have revealed that the presence of high amounts of heavy hydrocarbons in the absorber can also lead to foaming and the consequent flooding in the various stages of the process, in particular in the oxidizer zone 20, because heavy hydrocarbons change the surface tension. For preventing high amounts of heavy hydrocarbons, more specifically for preventing excessive foaming and the resulting flooding in the various stages of the process, the $H_2S$-containing gas stream 1 is optionally passed through a cooler E1 to keep the temperature of the H$_2$S-containing gas stream 1 within a suitable range, preferably in the temperature range between 30° C. and 40° C., and is then passed through a gas-liquid-separator 3 for separating liquid particles from the gas stream 2. The gas-liquid separator 3 can rely on any of the known concepts of mechanical gas-liquid separation, namely gravity (knock-out) separation, centrifugal (cyclone) separation, separation by impingement and separation by filters. More preferably, according to the present invention the gas-liquid separator is a gravity or knock-out drum having inlet and outlet connections located on the upper portion of a vessel. The force used to separate the liquid heavy hydrocarbons from the gas stream 2 is gravity. The gas velocity should be relatively low in this embodiment in order for separation to occur. After separation, the heavy hydrocarbon content which is in a liquid state exits via outlet 4 at the bottom of the drum 3 to thereby prevent the subsequent flooding of the contact zone 6.

The slurry formed at the bottom of the contact zone 6, which is the spent or reduced catalyst solution together with solid sulfur particles, from both the contact zone 6 and the top part of thereof, is pumped, by pump P1, to heat exchanger E2, before it enters the oxidizer zone 20. The heat exchanger E2 adjusts the temperature of the slurry to a temperature well below a degradation temperature of the catalyst solution, above which the catalyst degradation is relatively high. More specifically, the heat exchanger E2 keeps the temperature of the slurry a predetermined amount below the degradation temperature. In the exemplary embodiment, where polyvalent iron chelate is used as a catalyst, the temperature is adjusted in the range between 30° C. and 50° C., i.e. at a temperature lower than a temperature where the regeneration process is substantially slowed down and not higher than 50° C., above which temperature the catalyst degradation is relatively high.

According to another embodiment the contact zone 6 is an absorber. As schematically indicated by reference numeral 15, the absorber may contain a packing of a proper physical structure which will reduce the settlement of the solid sulfur particles that are formed during the process on the packing, which may cause plugging of the absorber, turbulancy of the streams and finally the flooding of the absorber. According to the present invention, such a packing consists of a plurality of packing elements that will be described in more detail with reference to FIG. 5, which shows an exemplary embodiment of a packing element used according to the present invention.

Figure 5:
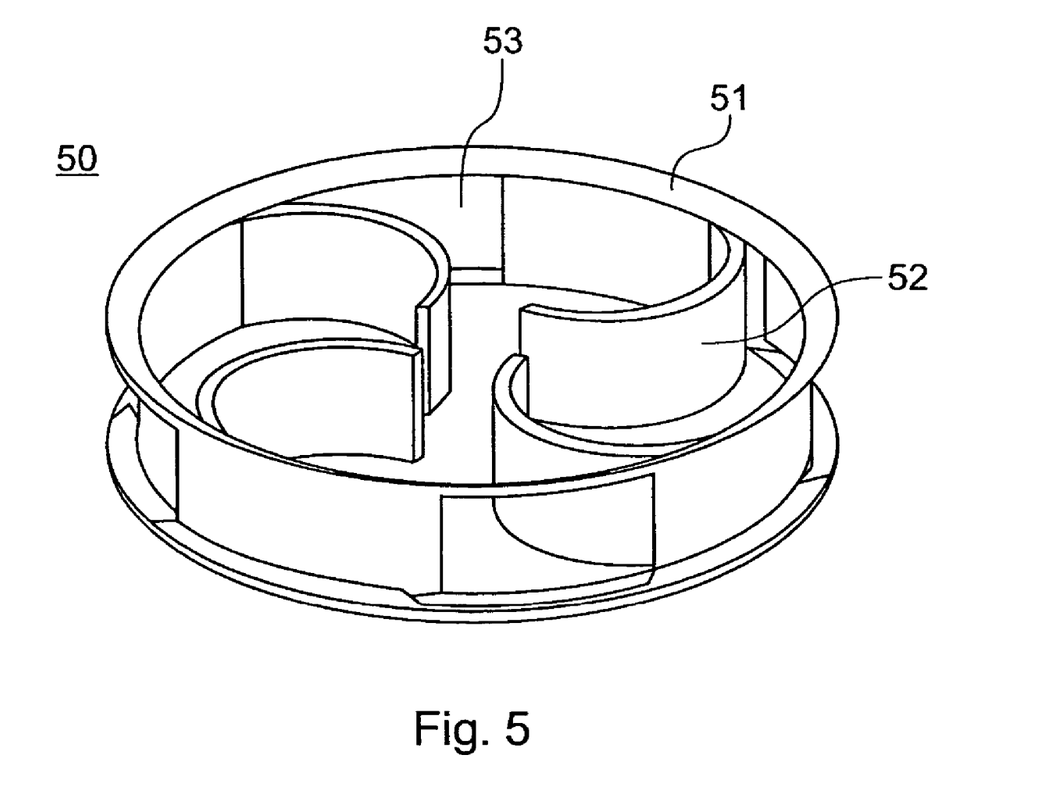
FIG. 5 shows an example for a metal packing element used in the absorber according to the present invention.

As shown in FIG. 5, the packing element 50 consists of two ring members 51 that are interconnected by webs 52 that form concavely curved wing-shaped surfaces that extend radially inwards. As shown in FIG. 5, the free ends of the webs 52 are adjacent to each other but do not contact each other, thereby leaving a free space. Thus, the packing elements 50 have a very high surface area to be wetted by the catalyst solution. The packing elements let the up-moving gas stream face a much larger surface area wetted by the catalyst solution. The remaining sulfur content of the gas stream reacts with the down-going catalyst solution, on the wetted packing, and approximately all of its sulfur content is removed in this way. The approximately completely H$_2$S-free gas leaves from the top part of the absorber 6 via outlet 11, while the down moving reduced catalyst solution joins the other reduced solution, which is from the Venturi scrubber, at the bottom of the absorber 6. Extensive experiments of the inventors proved that application of packing material as schematically shown in FIG. 5, preferably of stainless steel, leads to the least settlement of the solid particles, thereby reducing the probability of flooding of the system.

The packing is also put in the system in a way that it results in a minimum pressure drop in the system. The lower pressure drop moves the operating point farther away from the critical pressure drop at which flooding occurs (typically 10-20 mbar/m), which means additional vapor/liquid handling capability. This is done by putting the packing in a structured way in the three ends of the absorber 6.

More specifically, according to another preferred embodiment according to the present invention a part of the absorber 6 is filled with a structured packing whereas the remaining part of the absorber 6 is filled with a random packing as schematically shown in FIG. 5. In such an embodiment the random packing may have an aspect ratio of only 1:3, i.e. its height is typically only ⅓ of its diameter, which has a profound effect on the process performance of the packing. In operation, the flat ringshaped packing members tend to orient themselves preferentially in a 'near-horizontal' position, i.e. with their cylindrical axis predominantly in the direction of the gas and liquid flow, which results in a lower pressure drop due to an easier gas passage, and in a higher capacity. According to another preferred embodiment, the ringshaped packing members are arranged in cylindrical passages with an outer diameter of about 5 cm. Those parts with a structured packing may be provided adjacent in horizontal or vertical direction of the absorber 6.

As will become apparent to the person skilled in the art, the present invention is not limited to the use of random packing of the type schematically shown in FIG. 5 as a packing for the absorber 6. In general, other packings may also be used, e.g. conjugate ring packings, VSP ring packings, ball ring packings, saddles, Teller packings, rosette packings, helix packings, polyhedral hollow ball packings. Other structured packings that are also contemplated for use according to the present invention include oblique, gauze, perforated and corrugated plate packings.

In the following, the oxidizer zone according to the present invention will be described in more detail. As shown in FIG. 1, the oxidizer is formed as a cylindrical vessel 20 having a conical bottom 21. The slurry exiting the bottom of the contact zone 6, i.e. the spent or reduced catalyst solution together with solid sulfur particles, enters the oxidizer zone 20 via inlet 13 and via an outer circumferential surface of the cylindrical vessel 20, below the top surface of the liquid phase within the vessel 20. The temperature of the slurry is adjusted in the optimum range by the heat exchanger E2, as outlined above.

Air or another gas containing oxygen is blown into the cylindrical part of vessel 20 via line 22, suitably at a distance to the transition region between the bottom part 21 and the cylindrical part of the vessel 20. In the vessel 20 as result of the reaction of the reduced catalyst with the oxygen containing gas, e.g. air, the lower oxidation state of the metal ion in the chelate (Fe$^{2+}$ in the case of an iron chelate) is oxidized to its higher oxidation state (Fe$^{3+}$ in the case of an iron chelate). The reactions can be summarized by (4) and (5) as follows:

(4)

(5)

More specifically, air bubbles are blown into the oxidizer zone 20 by means of a sparger 23, which is connected with line 22. The oxidizer zone 20 is preferably a bubbling column partially filed with the liquid phase, i.e. the reduced catalyst solution and the slurry, into which air or another air containing gas is bubbled.

The sparger 23 induces an upward movement of air bubbles in the liquid phase. Furthermore, also some very small (lighter) sulfur particles 25 go up (rise) in the liquid phase within the vessel 20. As an additional component also heavy hydrocarbons, no matter how it has found its way to the oxidizer, contribute to this upward stream within the vessel 20. Thereby, a foam is generated on the top surface of the liquid phase within the oxidizer 20, which is to be avoided according to the present invention.

To reduce the effects of foaming, a low speed sweeper 29 driven by an electromotor 30 having a speed of 5-10 rpms is provided at the top end of the vessel 20. When rotating, the sweeper 29 collects any foam generated on the top surface of the liquid phase and leads it to a channel 37 (FIG. 3) to transfer the foam, via line 37', to a coalescer (V3) wherein the first steps of the separation process are performed and which will be described in more detail below.

Figure 3:
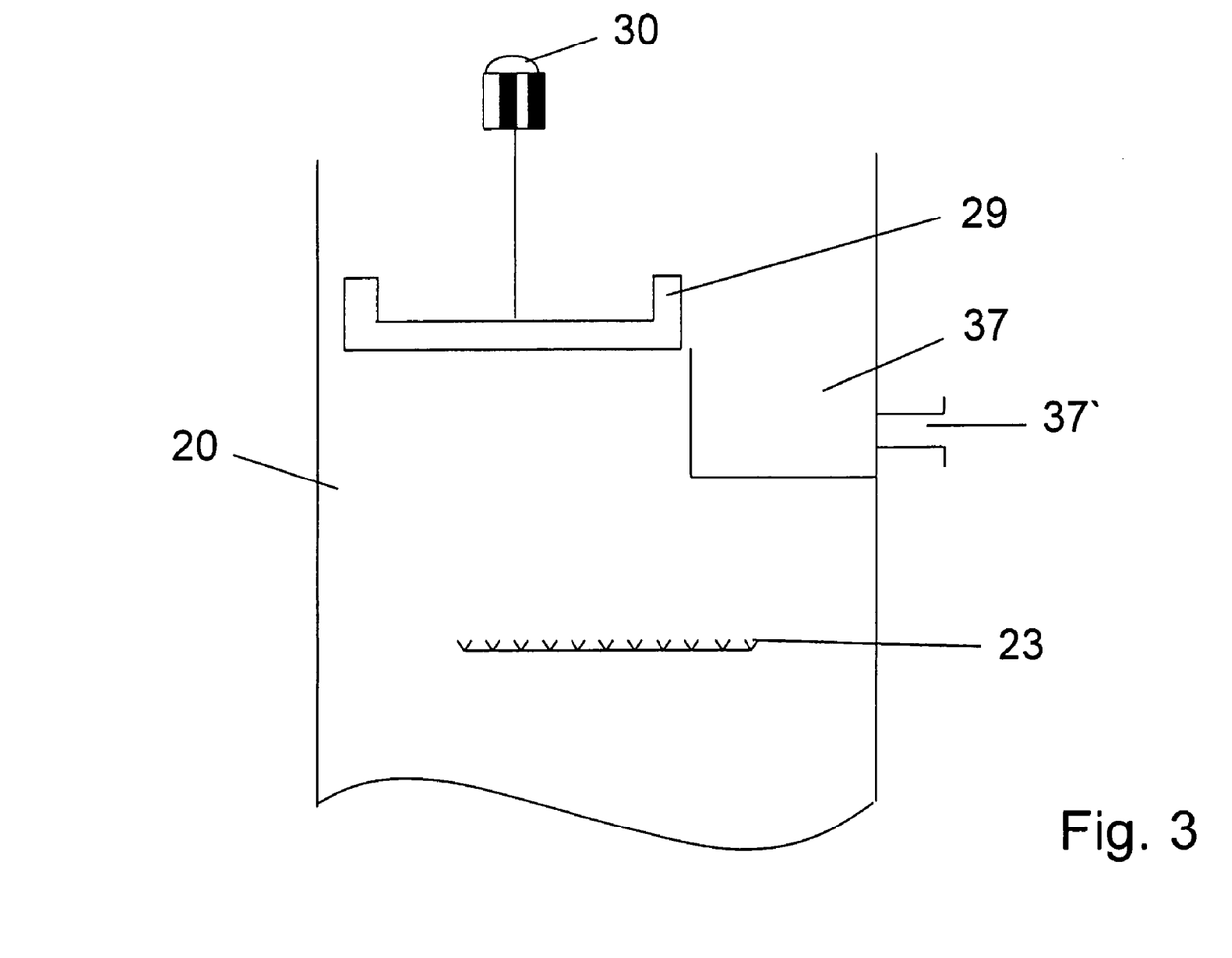
FIG. 3 is an enlarged partial sectional view of the oxidizer zone according to another embodiment according to the present invention showing an example for a sweeper disposed at an upper end of the oxidizer zone.

As shown in FIG. 3, the bottom of the sweeper 29 is flush with the surface of the liquid phase within the oxidizer 20. At a peripheral portion of the oxidizer 20, a channel 37 is formed by a vertical wall, whose top end is substantially flush with the surface of the liquid phase within the oxidizer 20, and a horizontal wall. Thus, any foam generated on the surface of the liquid phase within the oxidizer 20 is pushed by the rotating sweeper 29 over the top edge of the vertical wall into channel 37, from where the foam is guided, via line 37', to the coalescer.

As shown in FIG. 1, the oxidizer 20 is composed of two virtually separated sections, namely the upper first section above the sparger 23 and the lower second section below the sparger 23. In the upper first section the reaction between the catalyst and the air containing gas streams happens. In this first section, according to the chemical principles involved, turbulancy of the fluid streams is useful because it increases the reaction rate and efficiency. As shown in FIG. 1, the volume and dimensions of this first section are relatively large compared to the amount of the catalyst flow. On the other hand, the second lower section acts as a 'sulfur settling' section or 'catalyst clarifier' section, where the sulfur particles are separated from the catalyst streams. In this section, the turbulancy is reduced so that the heavier sulfur particles can settle and the lighter ones can go up to the surface of the liquid held in the vessel 20. In order to reduce turbulent effects in the lower section of the oxidizer in the present invention, the application of flow deflecting means, particularly the application of special baffles, is proposed. As a result of the use of flow deflecting means, in particular baffles, and also taking other measures like simultaneous settlement and floating separations, adding a coagulant in a proper time and place, use of a sweeper, and use of a special packing in the absorber zone, as explained in more detail in this invention, the plugging and foaming effects in the whole system are reduced.

On the other hand, the larger sulfur particles 26 or those enlarged as a result of attaching to one another (agglomeration) have a tendency to settle in the oxidizer zone 20 (sedimentation by gravity). Extensive experiments of the inventors revealed that one of the measures to reduce plugging and foaming effects in the whole system is to reduce any turbulent state in the lower second section of the oxidizer zone 20.

In order to reduce any significant disturbing effect of the stream of oxidized catalyst solution leaving the oxidizer zone 20 on the streams within the liquid phase in the oxidizer zone 20, according to the present invention a flow deflecting plate or similar means is disposed in the region near the outlet 35, in a manner similar to that to be described in more detail with reference to FIG. 2 below.

Figure 2:
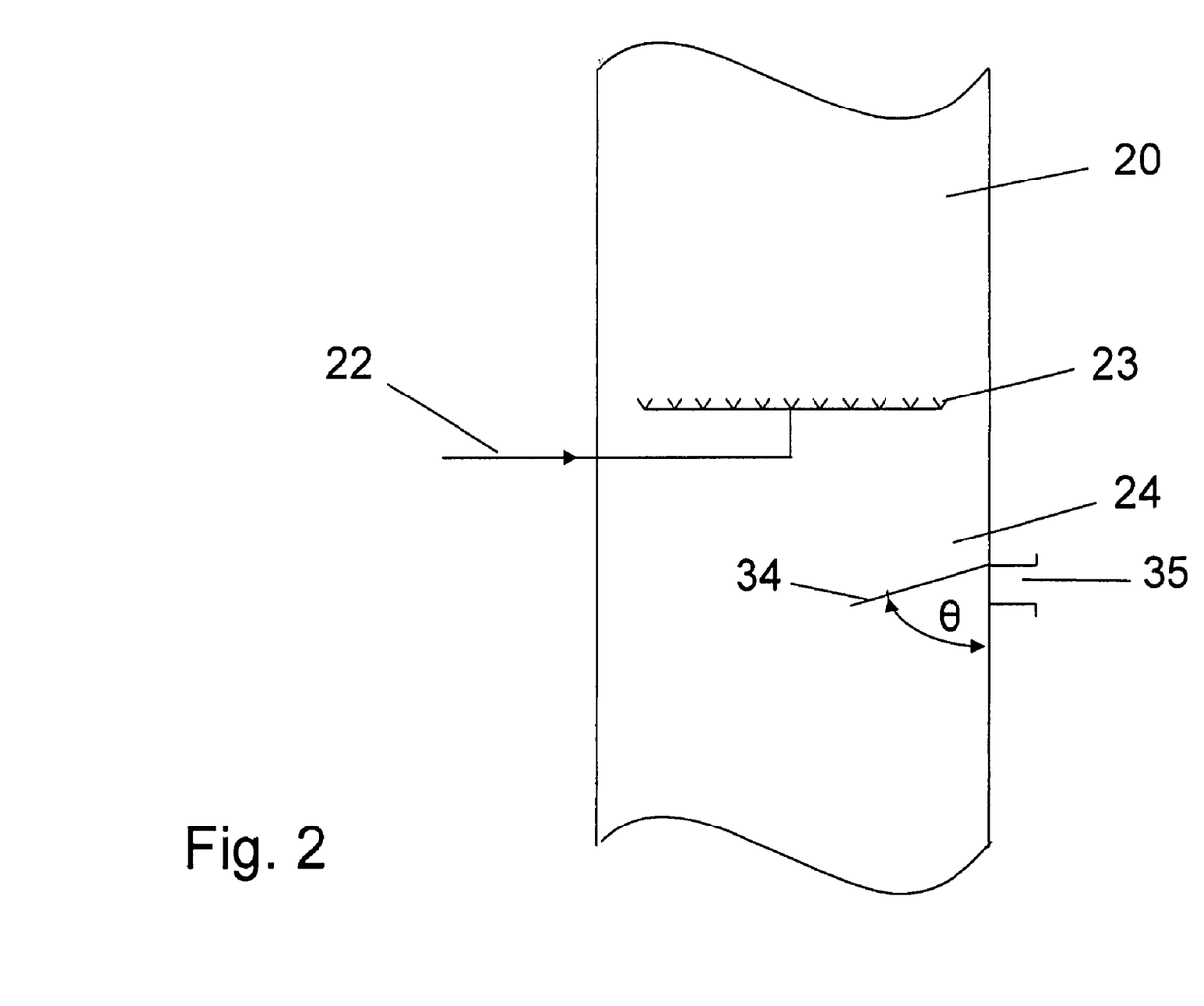
FIG. 2 is an enlarged partial sectional view of the oxidizer zone according to FIG. 1 showing an example for a baffle provided near the outlet of the reduced catalyst solution leaving the oxidizer zone.

Referring to FIG. 2, the flow deflecting plate 34 consists of a substantially slanted portion 34, which extends under an acute angle substantially in a vertically upward direction towards the top of line 35. Thus, according to this embodiment the flow of oxidized catalyst solution leaving the oxidizer zone 20 is smoothly deflected in a substantially horizontal direction so that the streams of liquid in the oxidizer zone 20 are substantially not effected and in particular no turbulent state is caused. Furthermore, the flow deflecting plate 34 also shields the orifice of line 35 from solid sulfur particles settling in the oxidizer zone 20. Thus, the flow deflecting plate 34 effectively prevents the direct flow of settling sulfur particles into the stream of oxidized catalyst solution leaving the oxidizer zone 20 via outlet line 35. As shown in FIG. 2, the flow deflecting plate 34 substantially covers the entire cross section of line 35. As will become apparent to a person skilled in the art, the flow deflecting plate 34 may, of course, also be curved in a convex manner. As no turbulent state is induced in the liquid phase in the oxidizer zone 20, settlement process (sedimentation by gravity) of the larger sulfur particles 26 is made more efficient.

As will become apparent to a person skilled in the art, a plurality of such flow deflecting plates can also be disposed at equiangular distances around the circumference of the cylindrical vessel 20.

According to a further embodiment (not shown), a similar flow deflecting plate may also be disposed within the path or stream of the slurry flowing out of the line 13 and into the oxidizer zone 20. Thus, according to this embodiment the slurry flow cannot directly enter the oxidizer zone 20 but is smoothly deflected into another direction so that the slurry flow entering the oxidizer zone 20 will not disturb the streams within the liquid phase in the oxidizer zone 20 significantly. In particular, the slurry flow will not cause further turbulent effects in the liquid phase.

In the following, the agglomeration of sulfur particles at the bottom of the oxidizer zone will be discussed in more detail with reference to FIG. 1 and FIG. 4. Extensive experiments of the inventors revealed also, that the solid sulfur particles 26, which tend to settle under the conditions as outlined above, will attach to the conical bottom 21 of the oxidizer zone 20. Agglomeration of the heavier sulfur particles 26 at the conical bottom 21 does not only make their transfer to the subsequent processing stage (the coalescer 40) very difficult, if not impossible, but also results in clogging and even flooding of the oxidizer zone 20, which is to be avoided.

Figure 4:
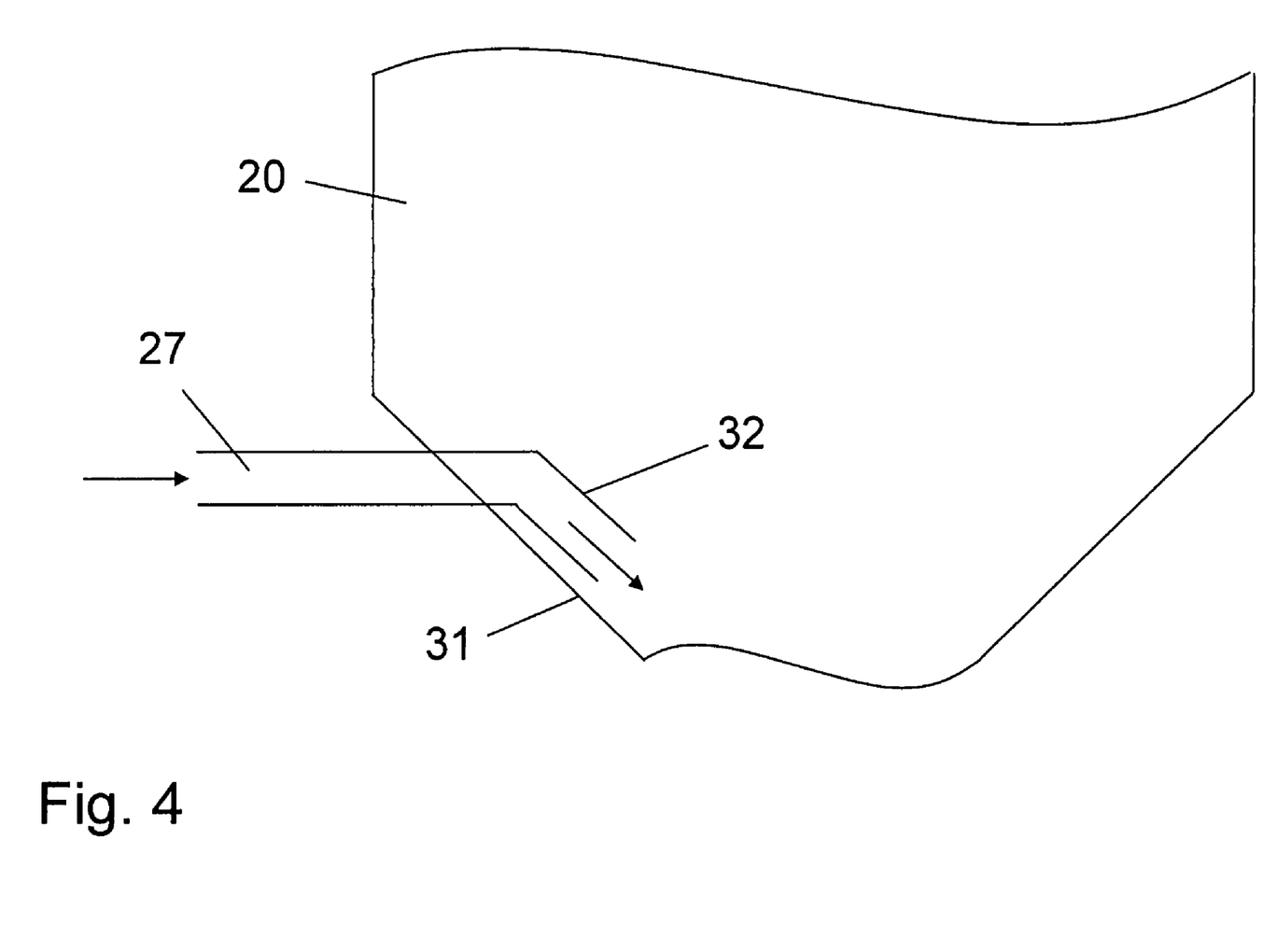
FIG. 4 is an enlarged sectional view of the bottom portion of the oxidizer zone according to another embodiment according to the present invention showing the flow of additional gas essentially tangential to the slanted bottom surface of the oxidizer zone.

To avoid this, according to another aspect of the present invention air streams 27 having a proper strength are injected in parallel to the downwardly slanted segments 31 of the conical part 21 of the oxidizer 20, as shown in more detail in FIG. 4. Thus, the heavier sulfur particles 26 are separated from the conical bottom 21 of the oxidizer zone 20 and driven to the outlet line 36 at the center of the conical bottom 21. These settled particles and the floating ones are transferred, via line 36 and pump P2, to the next separation stage 40 either simultaneously or at different timings. They can also be transferred continuously or in a batch-wise mode.

As shown in FIG. 4, a flow deflecting plate 32 is disposed at the orifice of line 27 supplying the stream of air to the bottom part of the oxidizer zone. More specifically, the flow deflecting plate comprises a substantially horizontal portion extending in radial inward direction as well as a slanted portion 32, which extends downwardly in a slanted manner and substantially in parallel with the slanted bottom surface 31. Thus, the flow of incoming air, or of an inert gas, is deflected into a direction substantially in parallel with or tangential to the slanted bottom surface 31, as indicated by the arrow. As will become apparent to a person skilled in the art, the gap between the inner surface of the flow deflecting plate 32 and the slanted bottom surface 31 may be relatively small as long as a stream of air of sufficient strength is obtainable.

According to another embodiment (not show), the flow deflecting plate 32 may also be directly attached to the slanted bottom surface as to prevent the direct entrance of the stream of air into the conical bottom part of the oxidizer zone. For causing the stream of incoming air into a direction substantially in parallel with the slanted bottom surface, a curved recessed portion may be provided at the bottom end of the inlet 27, so that the stream of air first impinges onto the plate and reflects back to the recession, which finally deflects the air stream in a direction substantially in parallel with or tangential to the slanted bottom surface 31.

According to another embodiment (not shown), the flow deflecting plate may also be disposed spaced apart from and substantially in parallel with the slanted bottom surface. The flow deflecting plate may prevent the direct entrance of air into the conical bottom part of the oxidizer zone and may divide the incoming stream of air into a first portion, which is deflected into an upward direction and substantially in parallel with or tangential to the slanted bottom surface, and another portion, which is deflected into a downward direction and substantially in parallel with or tangential to the slanted bottom surface.

As will become apparent to a person skilled in the art, a plurality of such flow deflecting plates can be disposed at equiangular distances around the circumference of the slanted bottom surface 31.

As shown in FIG. 1, the next separation stage is a coalescer 40 where coagulating reagent is added that helps the settlement process to be performed more efficiently. According to the present invention the coagulating reagent is preferably acryl amide, which enhances separation significantly. It is noteworthy that the larger sulfur particles transferred to the coalescer 40 play the role of nuclei in the subsequent nucleation process that will happen in the coalescer, which results in a significantly hither efficiency. Also the time and place of the addition of the coagulating reagent has a great impact on the separating and recovery efficiency. The inventors observed that the best settlement is achieved when the coagulating reagent is added 1-3 seconds before the entrance of the slurry to coalescer 40, which can be implemented e.g. by means of a valve through which the coagulating reagent is injected into line 36 before the slurry enters the coalescer 40. Settled (sedimented) sulfur particles are transferred via line 41 to the separation zone 42, which can be any of the various filter elements and preferably a rotary vacuum filter. After the filtration process the amount of the solid particles present in the filtrate 43, which is going to be recycled, is considerably reduced to thereby avoid plugging to a large extent. Recovered catalyst solution is transferred via line 44 back to the oxidizer zone 20.

Also, by the separation of a fraction of about 15-20% of the circulating stream, production costs are reduced, which could not be possible if the separation would be performed e. g. before the regeneration zone.

As will become apparent to a person skilled in the art, according to a particularly preferred embodiment of the present invention, any of the following measures, as explained in more detail above, can contribute in a particular combinatorial manner to substantially reduce plugging and foaming in a process for removing sulfur particles from an aqueous catalyst solution used to remove hydrogen sulfide from a gas stream, as outlined above:

using simultaneous settlement and floatation separations; and/or adding a coagulant in a proper time and place; and/or use of a sweeper; and/or use of a special packing in the absorber zone; and/or use of flow deflecting means, in particular baffles, in the oxidizer zone.

In accordance with the present invention a solution of a polyvalent metal in chelate form is contacted with the hydrogen sulfide-containing gas. The chelate solution, per se, may be selected from among the chelate solutions taught by the art to be useful in sulfur oxidation processes. Further, the metals which may be employed are those polyvalent metals which will oxidize hydrogen sulfide to sulfur and in turn be reoxidized by oxygen or similar gas. These metals are used with proper adjustment in concentration. Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum and tin. The metals are normally supplied as a salt, oxide, hydroxide etc.

The chelating agents or liquids which may be used together with polyvalent metallic cations are those which form a complex ion having stability in solution. These compounds may be of any substance which will effectively complex the metal ion by forming cyclic structures. These materials include aminopolycarboxylic acid chelating agents of the alkylenediamine and phenylene-diamine types, such as ethylendediamine tetracetic acid, nitrilotriacetic acid, or the like. They may also contain ammonia or an aliphatic, alicyclic or heterocyclic primary or secondary amine.

As will become apparent to the person skilled in the art, the term 'zone' as employed in the specification and appended claims includes, where suitable, the use of segmented equipment operated in series, or the division of one unit into multiple units because of size constraints, etc. E.g. a contacting column or absorption column might comprise two separate columns in which the solution from the lower portion of the first column would be introduced into the upper portion of the second column, the gaseous material from the upper portion of the first column being fed into the lower portion of the second column. Parallel operation of units is, of course, well within the scope of the present invention.

Thus, according to the present invention the following main advantages are achieved:

foam-producing heavy hydrocarbons can be eliminated;

the foaming and plugging is effectively controlled by using proper packings in the absorber;

proper controls are used to avoid flooding of the oxidizer;

the temperature is adjusted such that not only the reaction rate in the oxidizer is high, but also the catalyst degradation is kept low.

This application is based on European Patent Application No. 05104812.2 filed on Jun. 2, 2004, the entire contents of which are hereby incorporated by reference that fall within the true spirit and scope of the invention.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention.

What is claimed is:

1. A process for removing sulfur particles from an aqueous catalyst solution used to remove hydrogen sulfide from a gas stream, comprising the steps of:
   directing a flow of a suspension comprising reduced catalyst solution and sulfur particles to an oxidizer zone, where the catalyst solution is regenerated by contacting said suspension with a gas containing oxygen; and
   removing sulfur from said suspension at least by gravity sedimentation at a bottom of said oxidizer zone;
   further comprising the step of disposing a flow deflecting means at least at an outlet for the oxidized catalyst solution leaving said oxidizer zone for reducing any turbulent state caused at least by a stream of oxidized catalyst solution leaving said oxidizer zone such as to reduce foaming and plugging of the whole system.

2. The process according to claim 1, wherein said flow deflecting means is a baffle forming an acute angle with a circumferential surface of said oxidizer zone such that said stream of oxidized catalyst solution is deflected to another flow direction.

3. The process according to claim 1, wherein
   said oxidizer zone is a bubble column,
   said gas containing oxygen is bubbled into said column by means of at least one sparger so that lighter sulfur particles go up to an upper surface of a liquid phase within said column,
   and said flow of suspension enters said column at a position vertically disposed below said upper surface.

4. The process according to claim 1, wherein said bottom comprises a slanted surface and a gas is additionally injected at said bottom of said oxidizer zone substantially in parallel to said slanted surface for avoiding sedimentation and agglomeration of sulfur particles on said bottom.

5. The process according to claim 1, wherein at least one of lighter sulfur particles and foam floating on a surface of said liquid phase are collected by a rotating sweeper and removed from said oxidizer zone for further processing.

6. The process according to claim 5, wherein said at least one of lighter sulfur particles and foam are collected while heavier sulfur particles are removed at said bottom of said oxidizer zone and wherein the removed sulfur particles and/or foam are transferred for further processing continuously or in a batch wise mode.

7. A process for removing sulfur particles from an aqueous catalyst solution used to remove hydrogen sulfide from a gas stream, comprising the steps of:
   directing a flow of a suspension comprising reduced catalyst solution and sulfur particles to an oxidizer zone, where the catalyst solution is regenerated by contacting said suspension with a gas containing oxygen; and
   removing sulfur from said suspension at least by gravity sedimentation at a bottom of said oxidizer zone; wherein
   said flow of a suspension is heated or cooled to a predetermined temperature range before entering said oxidizer zone and
   at least one of lighter sulfur particles and foam are collected while heavier sulfur particles are removed at said bottom of said oxidizer zone and
   said at least one of removed sulfur particles and foam are transferred for further processing continuously or in a batch wise mode.

8. A process for removing sulfur particles from an aqueous catalyst solution used to remove hydrogen sulfide from a gas stream, comprising the steps of:
   directing a flow of a suspension comprising reduced catalyst solution and sulfur particles to an oxidizer zone, where the catalyst solution is regenerated by contacting said suspension with a gas containing oxygen; and
   removing sulfur from said suspension at least by gravity sedimentation at a bottom of said oxidizer zone; wherein
   the bottom of the oxidizer zone comprises a downwardly slanted surface and a gas is additionally injected at said bottom of said oxidizer zone substantially in parallel or tangentially to said slanted surface for avoiding sedimentation and agglomeration of sulfur particles on said bottom.

9. The process according to claim 8, wherein said flow of a suspension is heated or cooled to a predetermined temperature range before entering said oxidizer zone.

* * * * *